United States Patent
Rösel et al.

(10) Patent No.: US 10,563,633 B2
(45) Date of Patent: Feb. 18, 2020

(54) DETERMINING A LIFT OF A SOLENOID VALVE

(71) Applicant: CONTINENTAL AUTOMOTIVE GMBH, Hannover (DE)

(72) Inventors: Gerd Rösel, Regensburg (DE); Christian Hauser, Lappersdorf (DE); Markus Stutika, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 123 days.

(21) Appl. No.: 15/783,308

(22) Filed: Oct. 13, 2017

(65) Prior Publication Data

US 2018/0038332 A1    Feb. 8, 2018

Related U.S. Application Data (63) Continuation of application No. PCT/EP2016/058092, filed on Apr. 13, 2016.

(30) Foreign Application Priority Data

Apr. 15, 2015 (DE) .................... 10 2015 206 739

(51) Int. Cl.
*F02M 65/00* (2006.01)
*F02M 63/00* (2006.01)
(Continued)

(52) U.S. Cl.
CPC .......... *F02M 65/005* (2013.01); *F02D 41/20* (2013.01); *F02M 63/0017* (2013.01);
(Continued)

(58) Field of Classification Search
CPC .. F02M 65/005; F02M 63/0017; F02D 41/20; F16K 37/0041; H01F 7/08; H01F 7/1844
See application file for complete search history.

(56) References Cited

U.S. PATENT DOCUMENTS

| | | | |
|---|---|---|---|
| 2007/0236084 A1* | 10/2007 | Frank | B60T 8/327 303/119.2 |
| 2018/0030912 A1* | 2/2018 | Hauser | F02D 41/20 |

FOREIGN PATENT DOCUMENTS

| | | |
|---|---|---|
| CN | 103857950 | 12/1899 |
| DE | 19501766 A1 | 7/1996 |

(Continued)

OTHER PUBLICATIONS

International Search Report and Written Opinion dated Jul. 14, 2016 from corresponding International Patent Application No. PCT/EP2016/058092.

(Continued)

*Primary Examiner* — Bryan Bui (57) ABSTRACT

A device and a method are provided for determining a stroke of an armature of a magnetic valve which has a coil and the armature is displaceable by magnetic force, including: providing at least one reference data set which includes a magnitude of a current through the coil and a magnitude of the magnetic flux in the case of a known magnitude of the stroke; generating a current flow through the coil of the magnetic valve in order to generate a magnetic field for generating a magnetic force on the armature, which magnetic force displaces the armature in the direction for the opening of a closure element coupled to the armature; determining a magnitude of the magnetic flux when the armature abuts against a driver of the closure element; and determining the magnitude of the stroke based upon the determined magnitude of the magnetic flux and the reference data set.

19 Claims, 4 Drawing Sheets

(51) Int. Cl.
F02D 41/20 (2006.01)
F16K 37/00 (2006.01)
H01F 7/08 (2006.01)
(52) U.S. Cl.
CPC .......... *F16K 37/0041* (2013.01); *H01F 7/08* (2013.01); *F02D 2041/2003* (2013.01); *F02D 2041/2055* (2013.01); *F02D 2200/063* (2013.01)

(56) References Cited

FOREIGN PATENT DOCUMENTS

| | | |
|---|---|---|
| DE | 19505219 A1 | 8/1996 |
| DE | 19544207 A1 | 6/1997 |
| DE | 10020896 A1 | 10/2001 |
| DE | 102007047127 A1 | 4/2009 |
| DE | 102008001397 A1 | 10/2009 |
| DE | 102011075935 A1 | 11/2012 |
| DE | 102012000766 A1 | 7/2013 |
| EP | 1165944 A1 | 1/2002 |

OTHER PUBLICATIONS

German Office Action dated Jan. 15, 2016 for corresponding German Patent Application No. 10 2015 206 739.4.
Korean Office Action dated Jun. 5, 2018 for counterpart Korean Patent Application No. 10-2017-7029617.
Chinese First Office Action dated Mar. 28, 2019 for corresponding Chinese Patent Application 201680022178.3.

* cited by examiner

DETERMINING A LIFT OF A SOLENOID VALVE

CROSS REFERENCE TO RELATED APPLICATIONS

This application claims the benefit of PCT Application PCT/EP2016/058092, filed Apr. 13, 2016, which claims priority to German Application 10 2015 206 739.4, filed Apr. 15, 2015. The disclosures of the above applications are incorporated herein by reference.

FIELD OF INVENTION

The present invention relates to a method and a device for determining a stroke of an armature of a magnetic valve which is used in an automobile for the injection of fuel. The present invention also relates to a method for actuating a magnetic valve, wherein the actuation is based on a stroke, determined in accordance with the invention, of an armature of the magnetic valve.

BACKGROUND

A magnetic valve or a solenoid injector may be used for injecting fuel into a combustion chamber, such as a cylinder. A solenoid injector of said type (also referred to as coil-type injector) has a coil which generates a magnetic field when current flows through the coil, whereby a magnetic force is exerted on an armature such that the armature is displaced in order to effect an opening and closing of a nozzle needle or of a closure element for the purposes of opening and closing the magnetic valve. If the magnetic valve or the solenoid injector exhibits a so-called idle stroke between armature and nozzle needle or between armature and closure element, then a displacement of the armature leads to a displacement also of the closure element or of the nozzle needle not immediately but rather only after the armature has been displaced by the magnitude of the idle stroke.

When a voltage is applied to the coil of the magnetic valve, electromagnetic forces cause the armature to be moved in the direction of a pole piece. By means of a mechanical coupling (for example mechanical contact), after the idle stroke has been overcome, the nozzle needle or the closure element likewise moves and, in the case of corresponding displacement, opens up injection holes for the feed of fuel into the combustion chamber. If current continues to flow through the coil, the armature and nozzle needle or closure element move further until the armature arrives at and abuts against the pole piece. The distance between the abutment of the armature against a driver of the closure element or of the nozzle needle and the abutment of the armature against the pole piece is also referred to as needle stroke or working stroke. To close the valve, the excitation voltage applied to the coil is deactivated, and the coil is short-circuited, such that the magnetic force is dissipated. The short-circuiting of the coil results in a polarity reversal of the voltage owing to the dissipation of the magnetic field stored in the coil. The magnitude of the voltage is limited by means of a diode. Owing to a restoring force which is provided for example by a spring, the nozzle needle or closure element including armature are moved into the closed position. Here, the idle stroke and the needle stroke are passed through in the reverse sequence.

The time of the start of the needle movement during the opening of the magnetic valve is dependent on the magnitude of the idle stroke. The time of the abutment of the needle or of the armature against the pole piece is dependent on the magnitude of the needle stroke or working stroke. The injector-specific time variations of the start of the needle movement (opening) and of the end of the needle movement (closing) may, in the case of identical electrical actuation, result in different injection quantities.

According to the prior art, idle strokes and working strokes are at present mechanically set and measured during the injector assembly process or valve assembly process. It has however been identified that the idle stroke and/or the armature stroke of a magnetic valve may vary over the service life or over the operating duration as a result of running-in processes or wear, for example settling of components. This can result in uncontrolled, unidentified or unmonitored changes in a desired injection quantity or in a profile with respect to time of a combustion process. Conventionally, a determination of the stroke values or of the change in the stroke values during the service life of the injector has not been performed.

SUMMARY

It is therefore an object of the present invention to provide a method and a device for determining a stroke of an armature of a magnetic valve, which method exhibits high reliability and accuracy such that, on the basis of the determined stroke (in particular idle stroke and/or working stroke), it is furthermore possible to perform an actuation of the magnetic valve in order to ensure or attain a desired injection quantity and a desired profile with respect to time of the injection of the fuel.

Embodiments of the present invention propose methods for identifying the travels of the idle stroke and/or of the needle stroke. Here, the magnitudes of the idle stroke, needle stroke and/or working stroke may be utilized for determining the injection characteristic, for example as parameters for a model-based calculation of the injection characteristic. Furthermore, in the case of injector concepts without an idle stroke, only the needle stroke or working stroke is determined.

According to a first aspect of the present invention, a method is provided for determining a stroke of an armature (idle stroke and/or working stroke) of a magnetic valve which has a coil and the armature which is displaceable by magnetic force (with the aid of which, by means of a controllable closure element, fuel can be injected into a combustion chamber). Here, the method has providing at least one (or more) reference data set(s) which comprise(s) a magnitude of a current through the coil and a magnitude of the magnetic flux in the case of a known magnitude of the stroke, generating a current flow through the coil of the magnetic valve in order to generate a magnetic field which is in order to generate a magnetic force on the armature, which magnetic force displaces the armature in the direction for the opening of the closure element, determining a magnitude of the magnetic flux when the armature abuts against a driver of the closure element, and determining the magnitude of the stroke on the basis of the determined magnitude of the magnetic flux and the reference data set.

The method may be carried out in a workshop, in a production factory or else in a vehicle which is in an operational state. An idle stroke and/or a working stroke may be determined. The reference data set may be determined from training data or by means of measurements at the magnetic valve in the case of a known magnitude of the stroke and in particular in the case of different known strokes. Here, it is for example possible for one and the same magnetic valve to be intentionally adjusted with regard to, for example, a position of a pole piece in order to thereby obtain different working strokes and/or idle strokes. The strokes may be measured optically or mechanically for the purposes of creating the reference data set.

The magnetic flux may extend, for example, through the armature and, for example, through parts of the pole piece and also through parts of the closure element or of a driver, in particular ring-shaped driver, of the closure element.

The current flow may be generated by application of a determined voltage, in particular in accordance with a determined voltage profile, in which the voltage changes with respect to time. Here, the magnetic flux may, for example, be determined mathematically from current, voltage and an ohmic resistance of the coil, in particular from the current flowing through the coil, from the voltage applied to the coil and from the ohmic resistance of the coil. Here, the magnetic flux may be obtained by integration with respect to the difference in the voltage and the current multiplied by the ohmic resistance.

If the determined magnetic flux is equal to the magnetic flux observed in the reference data set in the case of the same current, it may be inferred that the magnitude of the stroke is equal to the known magnitude of the stroke (of the reference data set). If the determined magnitude of the magnetic flux deviates from a magnitude of a magnetic flux in the case of an identical current intensity in the reference data set, it may be inferred that the magnitude of the stroke has changed. A relative determination of the magnitude of the stroke may be performed by virtue of the known magnitude of the stroke in the reference data set having a stroke change added thereto, which stroke change is proportional to the deviation of the determined magnitude of the magnetic flux from the magnitude of the magnetic flux in the reference data set. The reference data set may thus describe a change in the stroke in the case of a change in the magnetic flux, which can be expressed by a gradient (of a characteristic map). In this way, a relative stroke determination may be performed. Without knowledge of the absolute stroke from a prior measurement, it is possible to at least determine the change in the stroke (drift) and react to the change in stroke.

In other embodiments, the reference data set permits an absolute stroke determination.

Through the use of the reference data set, a determination of the magnitude of the stroke may be performed more reliably and more accurately than is known from the prior art.

The reference data set may, for example, be representative of a curve (two-dimensional curve) in a coordinate system in which the current flowing through the coil is plotted on one axis (for example the X axis) and the magnetic flux (as calculated, for example) is plotted on the other axis (for example the Y axis). Here, the curve may, for example, include all phases during the movement of the armature or of the closure element during an opening and/or closing, or in particular only during the opening, of the magnetic valve. In other embodiments, the curve includes only a partial region of a curve which represents the entire movement sequence, in particular a partial region during the movement of the armature toward the pole piece, in the case of which, however, the closure element remains fixed, that is to say unmoved, and the armature thus does not displace, but makes contact with, the closure element or a driver of the closure element. In this way, a scope of the reference data set may be kept small, and the reference data set may be created more conveniently and quickly. Thus, the method may be performed without opening the magnetic valve, for example in order to avoid emissions.

The method may furthermore include determining a deviation of the determined magnitude of the magnetic flux from a magnitude of the magnetic flux of the reference data set assigned to the same current value. Furthermore, the method may have using an already-known sensitivity (calculated as a derivative or as a difference quotient) of the magnitude of the magnetic flux as a function of the magnitude of the stroke (for example idle stroke or working stroke), or an already-known sensitivity of the magnitude of the stroke as a function of the magnitude of the magnetic flux, in order to determine the magnitude of the stroke. It would thus be possible, for example, to perform a relative stroke magnitude determination. The method may thus be performed easily, because only the deviation and the sensitivity may be required to determine the magnitude of the stroke.

The magnitude of the magnetic flux may, for example, be determined before a first state is attained, in which the armature begins to displace the closure element. It is thus possible to avoid the magnetic valve opening, which could for example result in undesired emissions. Thus, the magnetic valve does not need to be opened or subsequently closed. Thus, the method may be performed easily and quickly.

In particular, the magnitude of the magnetic flux may be determined after a further state is attained (but before the first state is attained), proceeding from which an idle stroke of the armature has been overcome and the armature abuts against a driver of the closure element. If the current through the coil is increased further while the armature is abutting against the driver of the closure element, then the magnetic force increases but the closure element is initially not displaced because, for the displacement of the closure element, an opposing force must be overcome, which may for example be generated by a restoring spring. The tracking and/or recording and/or measurement and/or calculation of the magnetic flux during said static state, in which the armature bears against the driver of the closure element and the magnetic force is increased, may however advantageously allow conclusions to be drawn regarding the stroke or working stroke of the magnetic valve. In particular, the change in the magnetic flux in said state in the event of a change in the current through the coil may take place as a function of the stroke, such that the stroke may be inferred from the change in the magnetic flux.

In accordance with one option in the method, consideration is given to pairs of a magnitude of a current and of a magnitude of the magnetic flux, in particular in a graph (said pairs in particular being plotted in a graph), which (in particular in the case of a voltage being applied in accordance with an actuation profile to the coil) may correspond to a state trajectory of the closure element or of the armature during a closing process of the magnetic valve. Here, the first state may be associated with a pair in the case of which a sign of a gradient changes along the state trajectory. It is thus possible for the first state to be detected in a simple and reliable manner. The curve may have a point of inflection in the first state.

The reference data may be carried out by a measurement at the (same) magnetic valve in the case of different set pole piece positions in order to determine reference data for different strokes. It is thus possible for the reference data to be obtained in a simple manner. The use of one and the same magnetic valve ensures that inaccuracies owing to possible different materials or slightly different geometries of two non-identical magnetic valves are avoided.

By means of adjustment of the pole piece position, it is for example possible for a certain working stroke (or idle stroke) to be set and thereafter optionally also mechanically or optically measured. It is thereupon possible for a voltage to be applied in accordance with a voltage profile to the coil, and the voltage and current may be measured by means of the progression of the voltage profile. Using algebra, the magnetic flux may be calculated from current, voltage and the resistance of the coil. The current and the magnetic flux may then be illustrated in a graph or else listed in tables. For the determination of the stroke (in particular working stroke and/or idle stroke), only that part of the curve in the graph which is situated before the first state needs to be used.

An unknown stroke at a point in the service life of the magnetic valve may then be obtained by recording at least a part of a state trajectory of the armature or of the closure element, wherein the state trajectory or the part of the state trajectory is compared with that of the reference data. Deviations of the state trajectory from the reference state trajectory in particular before the first state, or up until the point at which the first state is reached, indicates a change in the stroke. The change may be calculated from a difference in the magnetic flux and a sensitivity (for example, stroke as a function of the magnetic flux).

For the generation of the current flow through the coil, firstly a boost voltage (for example rectangular), in particular between 3 V and 65 V, and subsequently a holding voltage, in particular between 6 V and 14 V, may be applied. A total duration of such a voltage profile may amount to, for example, between 1 ms and 3 ms, wherein the duration of the application of the boost voltage may, for example, amount to between 0.2 and 0.7 ms. Other parameters are possible.

The armature may in particular include a slotted ferromagnetic material, and/or layers of ferromagnetic material which are electrically insulated with respect to one another, in order to reduce eddy currents. It is thus possible to support even relatively high boost voltages for the purposes of performing a stroke determination. If the armature does not have slotted ferromagnetic material and has no electrically insulated layers, the boost voltage may for example be set to lower values, for example between 3 V and 18 V, in particular to approximately 3 V, 6 V, 12 V or 18 V. An identification in particular of the first state may thus be facilitated.

According to a second aspect of the present invention, a method is furthermore provided for actuating a magnetic valve which has a coil and an armature which is displaceable by magnetic force and with the aid of which, by means of a controllable closure element, fuel may be injected into a combustion chamber. Here, the method has carrying out a method for determining a stroke of an armature of the magnetic valve as claimed in one of the preceding embodiments, and also actuating the coil of the magnetic valve on the basis of the determined stroke (in particular working stroke and/or idle stroke). For example, as a function of the determined stroke, a duration between the application of a boost voltage for the purposes of opening the magnetic valve and the application of a voltage for the purposes of closing the magnetic valve may be changed, in particular reduced or increased, if it is determined that the working stroke and/or idle stroke has increased or decreased respectively in relation to a previous stroke. It is thus possible for a desired injection quantity or a desired injection characteristic of fuel to be ensured or attained even in the case of a stroke changing during the service life.

It is to be understood that features that have been described, provided or used individually or in any combination in conjunction with a method for determining a stroke of an armature of a magnetic valve are likewise applicable individually or in any combination to a device for determining a stroke of an armature of a magnetic valve as per embodiments of the present invention, and vice versa.

According to a third aspect of the present invention, a device is furthermore provided for determining a stroke of an armature of a magnetic valve which has a coil and the armature which is displaceable by magnetic force. Here, the device has a memory for providing at least one reference data set which includes a magnitude of a current through the coil and a magnitude of the magnetic flux in the case of a known magnitude of the stroke, a driver for generating a current flow through the coil of the magnetic valve in order to generate a magnetic field which is in order to generate a magnetic force on the armature, which magnetic force displaces the armature in the direction for the opening of the closure element, and a determination module which is designed to determine a magnitude of the magnetic flux when the armature abuts against a driver of the closure element and to determine the magnitude of the stroke on the basis of the determined magnitude of the magnetic flux and the reference data set.

The device may, for example, be a special workshop device, assembly workshop device or production factory device, or may, for example, be integrated in an engine controller, such that a method may be carried out even during operation of a vehicle. As an alternative to a memory, the reference data set could also be made available via an input/output interface of the device, such that the memory does not imperatively have to be required. The determination module may, for example, include an arithmetic/logic unit, for example a processor. The device may in particular be programmable. It is thus possible for changes to a method for determining a stroke of an armature to be easily introduced or implemented.

The magnetic flux may extend through the armature and partially through a pole piece which is fixed relative to the coil. The method may however be carried out within a particular operating mode during normal driving operation of an automobile. For example, the method may be carried out when the automobile is at idle, wherein a special voltage profile may be used, which in particular has lower boost voltages than in normal propulsion operation of the vehicle.

The following applications of the method are possible:
1. The strokes may be set during the injector assembly process or magnetic valve assembly process. Here, an initial determination of the absolute strokes and a determination of a reference curve may be performed. Furthermore, a determination of the further strokes from changes in the $\Psi$-I curves may be determined for reference with the stroke sensitivity. It may thus advantageously be achieved that an electronic stroke determination is faster than a mechanical stroke determination, that is to say a cycle time increase is possible in the manufacturing process.

A further advantage is an increase in the accuracy of the stroke setting.
2. The stroke determination may also be performed during the service life of the injector, that is to say the service life of the magnetic valve. The determination of the stroke changes (drift) may be determined during the service life by means of changes with respect to the reference curve with the aid of the stroke sensitivity. The reference curve or reference data or reference curves may be measured and stored on an injector-specific basis (that is to say individually for the respective magnetic valve) during the vehicle commissioning process. If the initial values (from measurement during the manufacturing process) of the strokes are known in the control unit (injector coding or equating of the strokes during assembly), then the absolute stroke may be determined from initial values and drift.

In embodiments of the present invention, a determination of geometrical variables (idle and/or armature stroke) is performed by means of measurement of the interlinked magnetic flux during the injector assembly process and/or during the service life of the injector on the vehicle. Furthermore, a measurement of partial regions of the curve may be performed without opening the injector (that is to say without opening the magnetic valve).

An absolute injector stroke determination may be performed as a combined method involving absolute measurement and relative measurement. A determination of the stroke drift (or change in stroke magnitude) may be performed by means of a relative method in which the change in the magnitude of the stroke is determined for example from the change in the magnetic flux.

In the case of the method being utilized during the injector assembly process, a one-off mechanical measurement of the stroke may suffice. Changes in the stroke, for example as a result of pressing-in of the pole piece, may then be determined on the basis of the change in the $\Psi$-I curve in relation to the reference data. By dispensing with mechanical measurement, the assembly process may be performed more quickly, because the electrical measurement may take less time. The method may be utilized during the service life of the injector for the determination of strokes.

The use of an injector with small/low eddy currents (by means of a layered construction of the armature or by means of a slotted armature) may be advantageous in order that the $\Psi$-I curves may be determined during standard actuation (for example boost voltage of approximately 65 V).

It is advantageously possible for geometrical variables to be determinable by means of the stroke measurement according to embodiments of the present invention. In this way, additional and/or alternative variables may be determined for the purposes of determining the injector characteristic (in addition to variables with respect to time). It is also possible for further (geometrical) parameters for model-based injector characterization with regard to the needle movement or closure element movement and with regard to the injection characterization to be provided. In this way, improved quantity accuracy with regard to the injected fuel may be achieved. The determination of stroke magnitudes during the service life of the injector in the installed state on the vehicle may likewise provide advantages. By implementing the measurement method in an existing engine control unit, only a small amount of additional outlay (hardware adaptation, software expansion) is necessary.

The measurability of the $\Psi$-I curves with the standard actuation may be facilitated through the use of injectors exhibiting reduced eddy currents. Furthermore, a measurement of only partial regions of the $\Psi$-I curve may be performed without the valve actually being opened, that is to say without fuel being injected, and thus without influence on emissions.

BRIEF DESCRIPTION OF THE DRAWINGS

Embodiments of the present invention will now be discussed with reference to the appended drawings. The invention is not restricted to the illustrated or described embodiments.

DETAILED DESCRIPTION

Figure 1:
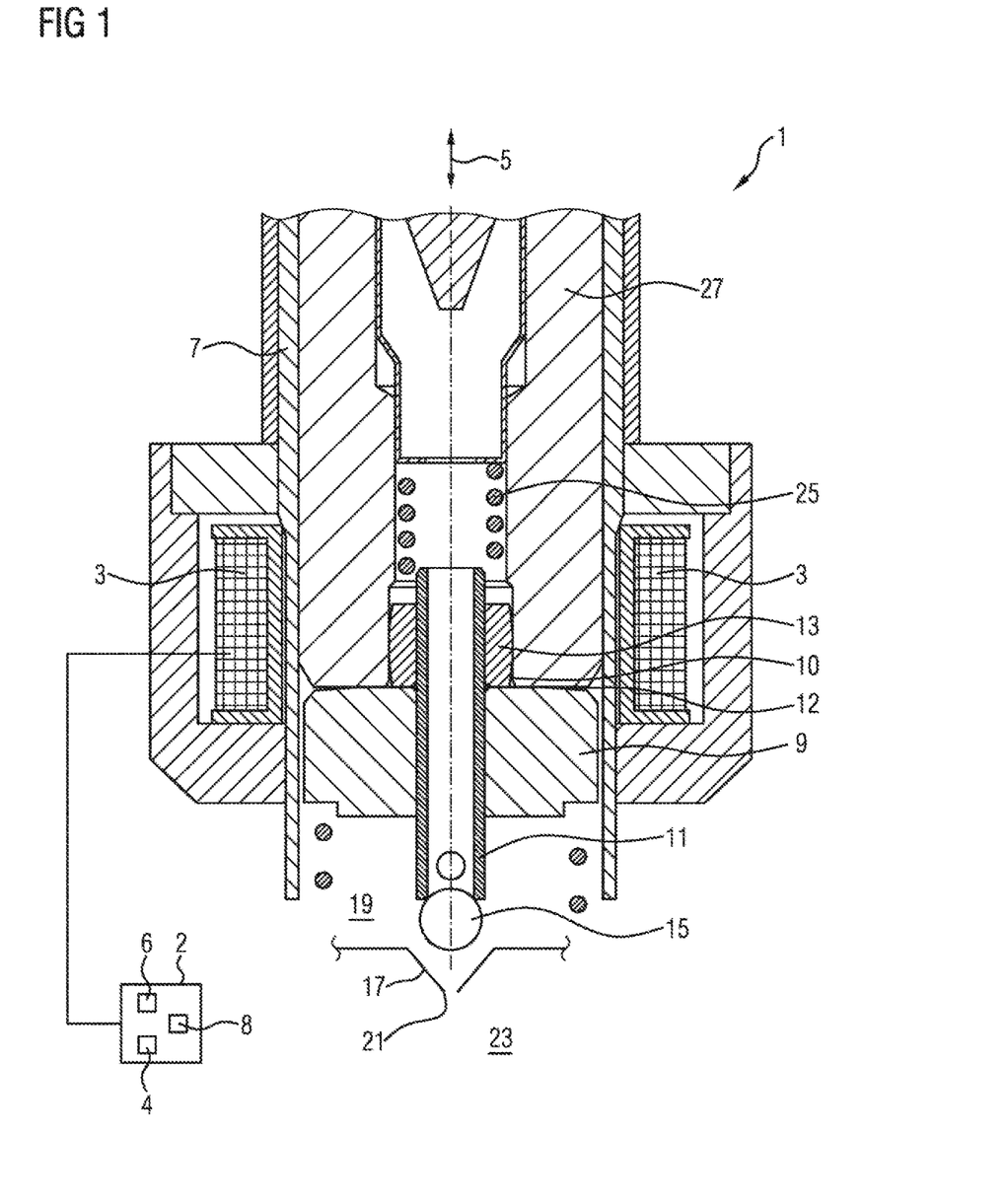
FIG. 1 illustrates, in a schematic sectional illustration, a magnetic valve whose stroke may be determined in accordance with a method for determining a stroke, for example using a device for determining a stroke according to embodiments of the present invention.

The magnetic valve 1 illustrated in a schematic sectional illustration in FIG. 11 has a coil 3 to which a voltage may be applied such that a current flow through the coil 3 occurs for the purposes of building up a magnetic field. Here, the magnetic field points substantially in a longitudinal direction 5 of a guide cylinder 7. The magnetic field acts on a ferromagnetic armature 9 which is displaceable within the guide cylinder 7. By means of displacement of the armature 9, a nozzle needle 11 or a closure element of the magnetic valve 1 may be displaced in the longitudinal direction 5, in particular as a result of contact of the armature 9 with a ring-shaped driver 13 which is fixedly connected to the closure element 11.

In the open state illustrated in FIG. 1, a closure ball 15 has been retracted out of a conical seat 17, such that fuel 19 may pass through an opening 21 in the seat into a combustion chamber 23 for the purposes of combustion. In the fully open state, the armature 9 bears against a pole piece 27, and may thus be displaced no further upward.

In a closed state of the magnetic valve 1 which is not illustrated in FIG. 1, the armature 9 is, in the absence of a current flow through the coil 3, displaced downward by a restoring spring 25, such that the driver 13 together with the closure element 11 is also displaced downward such that the closure ball 15 bears sealingly against the conical seat 17, such that fuel 19 cannot pass into the combustion chamber 23. In this downwardly displaced state of the armature 9, the driver 13, and likewise the armature 9, has moved through at least a working stroke 12 (during which the armature 9 and the driver 13 are in contact), and optionally also an additional idle stroke 10, in which a gap exists between the armature 9 and the driver 13.

Embodiments of the present invention permit a determination of the idle stroke and/or in particular of the working stroke of the magnetic valve 1 by virtue of the magnetic flux which passes through the armature 9 and partially through the pole piece 27 and the driver 13 being determined.

FIG. 1 furthermore illustrates a device 2 for determining a stroke of the armature 9 of the magnetic valve 1 according to an embodiment of the present invention. Here, the device 2 includes a memory 6 in which there may be stored, for example, a reference data set which includes a magnitude of a current through the coil and a magnitude of the magnetic flux in the case of a known magnitude of the stroke. Furthermore, the device 2 includes a driver 4 which is designed to generate a current flow through the coil 3. Furthermore, the device 2 includes a determination module 8, which is designed to determine a magnitude of the magnetic flux during an abutment of the armature 9 against the driver 13 or the closure element and to determine the magnitude of the stroke on the basis of the determined magnitude of the magnetic flux and the reference data set.

The determination of idle stroke and/or armature stroke (also referred to as working stroke) may be performed by means of the measurement and analysis of the interlinked magnetic flux $\Psi$. Here, the interlinked magnetic flux $\Psi$ may be calculated from the current flowing through the coil 3, the voltage applied to the coil 3, and the ohmic resistance of the coil 3. The measured voltage u(t) is composed of an ohmic component (i(t)*R) and an inductive component ($u_{ind}$(t)). The inductive voltage is in this case calculated from the derivative with respect to time of the interlinked magnetic flux, wherein $\Psi$ is dependent on the change in current i(t) and the air gap x(t).

$$u(t) = i(t)R + u_{ind} = i(t)R + \frac{d\Psi(i,x)}{dt} = i(t)R + \left(\frac{d\Psi(i,x)}{di}\frac{di}{dt} + \frac{d\Psi(i,x)}{dx}\frac{dx}{dt}\right)$$

In the case of slow actuation, the "magnetic" component of the induction as a result of change in current is small.

$$u_{ind1} = \frac{d\Psi(i,x)}{di}\frac{di}{dt}$$

The "mechanical" part of the induction as a result of the armature movement then describes the strokes (idle stroke and/or working stroke) of the magnetic valve.

$$u_{ind2} = \frac{d\Psi(i,x)}{dx}\frac{dx}{dt}$$

Through rearrangement and integration, the interlinked mechanical flux may be calculated as follows:

$$\Psi = \int (u(t) - i(t)R)dt$$

Figure 2:
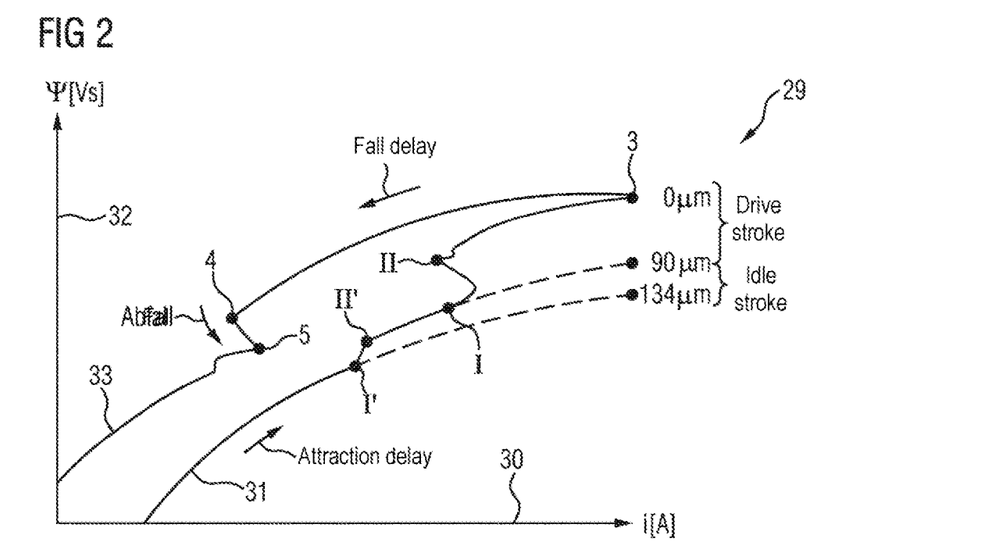
FIG. 2 illustrates graphs of reference data and state trajectories and measurement data of a magnetic valve whose stroke is to be determined according to embodiments of the present invention.

FIG. 2 illustrates a graph 29 with a state trajectory 31 during an attraction (that is to say during an opening process), and a trajectory 33 during a fall (that is to say during a closing process), of the magnetic valve 1 (here for the case with idle stroke). Here, the current i flowing through the coil 3 is plotted on an abscissa 30, and the magnetic flux $\Psi$ calculated in accordance with the above equation is plotted on the ordinate 32. The trajectory 31 may be determined, for example, during a method for determining a stroke of the magnetic valve, for example by measurement of current and voltage and calculation of the magnetic flux as discussed above. From a comparison with reference data or reference trajectories not illustrated in FIG. 2, the working stroke and/or idle stroke may be determined. The points I', II', I, II in FIG. 2 denote characteristic states during the opening process. Here, the idle stroke from 134 μm to 90 μm, that is to say the attraction of the armature 9 during the idle stroke, takes place between the points I' and II'. The working stroke from 90 μm to zero μm, that is to say the attraction of the armature 9 during the working stroke, takes place between the points I and II. In the region II'-I, the armature drives the nozzle needle along and is thereby briefly halted, and here, bears against the driver 13.

In embodiments of the present invention, for a magnetic valve without idle stroke (see bottom of FIG. 3), the region of the trajectory 31 before the point I is evaluated, and for a magnetic valve with idle stroke, the region between the point II' and I is evaluated, in order to determine said idle stroke, and before point I', the total stroke composed of idle stroke and working stroke is determined. Here, in the region I'-II', a gradient of the trajectory 31 changes in relation to the sections situated before and after said region. Furthermore, in the section between points I and II, the gradient changes from a positive value to a negative value.

Figure 3:
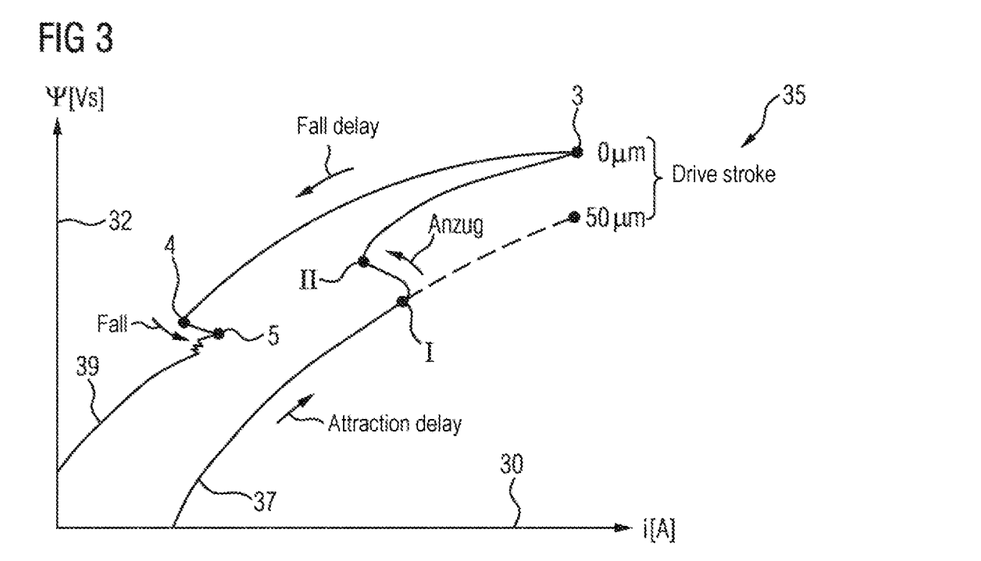
FIG. 3 illustrates graphs of reference data and state trajectories and measurement data of a magnetic valve whose stroke is to be determined according to embodiments of the present invention.

FIG. 3 illustrates a graph 35 which illustrates trajectories 37 and 39 during an attraction and a fall of the armature 9 of the magnetic valve 1, in the case in which the magnetic valve 1 does not exhibit an idle stroke. Since the idle stroke is absent in the trajectory 37 illustrated in FIG. 3, the characteristic points I' and II' illustrated in FIG. 2 are absent. The working stroke from 50 μm to 0 μm takes place between the points I and II. Here, the trajectory 37 has a bend at the point I, at which bend a positive gradient changes to a negative gradient. In this embodiment of the present invention, a stroke is determined from a section of the trajectory 37 before the point I.

Figure 4:
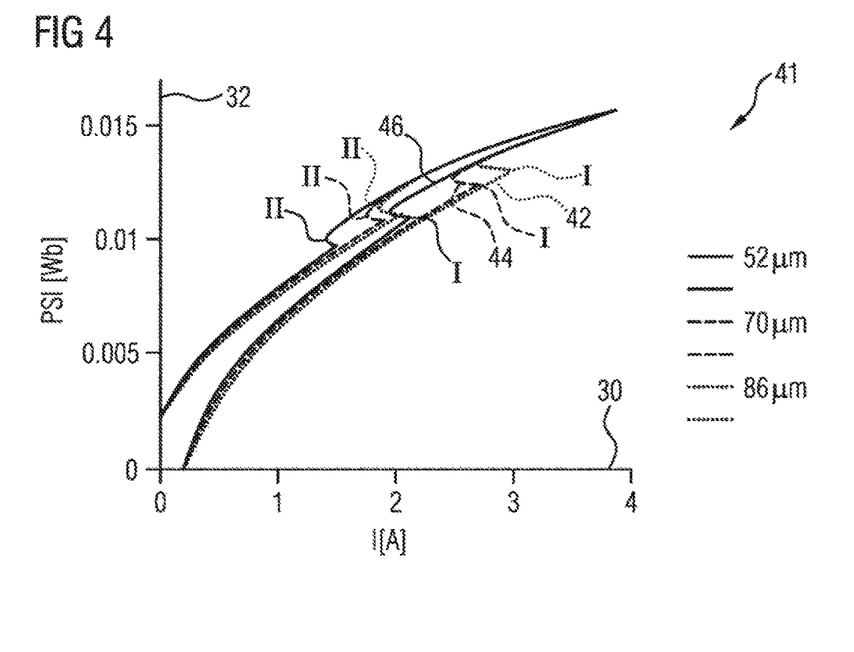
FIG. 4 illustrates graphs of state trajectories obtained in the case of different strokes.

FIG. 4 illustrates a graph 41 which, according to embodiments of the present invention, illustrates reference data or reference curves or reference trajectories (or measurement data) which have been measured by one and the same magnetic valve in the case of different strokes (in particular working strokes). Again, the current flowing through the coil 3 is plotted on the abscissa 30, and the magnetic flux $\Psi$ calculated in accordance with the above equations is plotted on the ordinate 32.

The trajectory or curve 42 has a working stroke of 86 μm, the curve 44 has a working stroke of 70 μm, and the curve 46 has a working stroke of 52 μm. As can be seen from FIG. 4, in each case, the state I is assigned to different magnetic fluxes or currents. The trajectories 42, 44 and 46 illustrated in FIG. 4 have been measured on a magnetic valve 1 which exhibits no idle stroke. The trajectories 42, 44, 46 may be used as reference data for the determination of an unknown stroke of the same magnetic valve at a later time during the operation or service life. For this purpose, it is for example possible for a sensitivity $\Delta\Psi/\Delta$Stroke to be calculated. If a measured trajectory deviates from one of the reference trajectories 42, 44, 46, then the difference of the magnetic flux may be multiplied by the sensitivity, or by a reciprocal of the sensitivity, in order to determine a change in the stroke in relation to the stroke of the corresponding reference curve. Conversely, the strokes may be determined from the changes in the magnetic fluxes of the trajectories 42, 44 and 46.

When the armature abuts against the needle or when the armature abuts against the pole piece, the mechanical strokes have been overcome, that is to say the mechanical stroke is equal to zero. The magnetic gaps may, however, not be equal to zero, because a magnetic gap may remain owing to magnetically non-conductive materials (on, for example, chromium coatings on the individual components) (despite the fact that the mechanical gap is equal to zero), which magnetic gap is measured in the $\Psi$-I curves. Furthermore, further parasitic gaps of the magnetic circuit are measured in the $\Psi$-I curves. The profile of a $\Psi$-I curve (for example, one of the curves 42, 44, 46) before the start of the movement of the closure element or the movement of the nozzle needle 11 (that is to say before the point I) includes all of the gaps in the case of a closed injector. The profile of the Ψ-I curve after the movement of the nozzle needle 11 (that is to say after the point II) includes all of the gaps in the case of an open injector. The curve characteristic may be utilized for the purposes of stroke determination. Since the change in flux includes magnetic and mechanical changes, the absolute determination of the mechanical stroke, which is definitive for the injection quantities, is afflicted with inaccuracy in the prior art. The magnetic gaps (different coating thicknesses (typical coating thickness per component 8 μm–15 μm) or parasitic gaps) and gap parameters and further injector characteristics are injector-specific, and thus lead to increased inaccuracy in the stroke measurement from the Ψ-I curves if reference curves 42, 44, 46 of FIG. 4 are not for example also taken into consideration for the determination of the stroke or the strokes.

To obtain the reference curves 42, 44 and 46 or else actual measurement curves of a magnetic valve whose stroke is to be determined, the actuation of the coil 3 may be performed with a much slower current build-up than, for example, during a propulsion state of a vehicle. A slower current build-up may be achieved for example by means of a relatively low boost voltage (for example, between 3 and 18 V rather than 65 V as in the propulsion state). In the case of standard actuation (for example, a boost voltage of 65 V), high eddy currents may be generated within the armature 9, which eddy currents can act as an electromagnetic damper and can influence the flux build-up or the flux profile through the magnetic circuit. The induction component as a result of armature movement is duly present even in the case of intense excitation, but becomes smaller in relation to the eddy currents with increasing excitation. That is to say, with increasing excitation voltage (for example, boost voltage), the stroke signal becomes less distinct.

Figure 5:
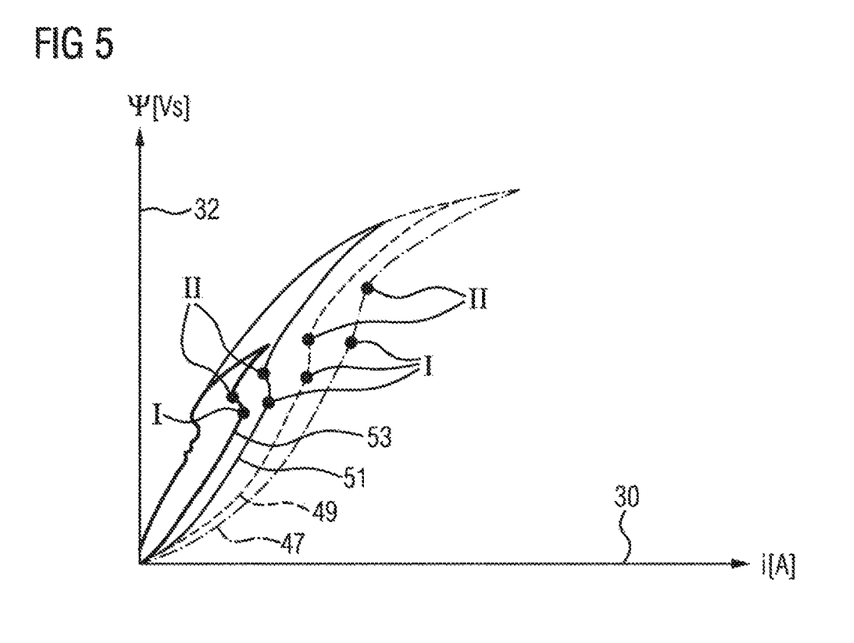
FIG. 5 illustrates graphs of state trajectories obtained by means of different actuation voltage profiles.

The form of the Ψ-I curve in the case of different actuation voltages (3 V-18 V) is illustrated in FIG. 5 by trajectories 47 (excitation voltage 18 V), 49 (excitation voltage 6 V), 51 (excitation voltage 12 V) and 53 (excitation voltage 3 V). As can be seen from FIG. 5, with increasing voltages, it becomes increasingly more difficult to reliably detect the states I and II, because only small changes in gradient occur. For example, in the case of an excitation voltage of 18 V, it may be difficult to reliably detect the state I. Therefore, a measurement of reference curves or a measurement for determining a stroke in the case of relatively small excitation voltages, for example between 3 V and 12 V, may be performed.

According to the prior art, various events may be measured over the course of time during the operation of the injector. The abutment of the armature against the driver 13 of the nozzle needle 11 at the start of the displacement (start of needle movement, injector opening) and against the pole piece (end of displacement) may be identified as a feedback signal from coil-driven assemblies, by virtue of the eddy-current-driven coupling between mechanism (armature and injector needle) and magnetic circuit (coil) being utilized for the signal generation. The physical effect is based on the speed-dependent self-induction in the electromagnetic circuits as a result of the movement of the armature and of the closure element. A voltage is induced in the electromagnet as a function of the movement speed, which voltage is superposed on the actuation signal (characteristic voltage). A suitable actuation form and evaluation unit may be required for this purpose.

For the determination of the stroke during an injector assembly process and also during a further service life, a method involving absolute stroke measurement and relative stroke measurement is proposed in embodiments of the present invention. The absolute stroke measurement may, for example, be performed for the first time during the injector assembly process (for example, mechanically (probe), optically (laser)). If a Ψ-I curve is now measured with known armature/needle strokes (such as for example the trajectories 42, 44, 46, which are illustrated in FIG. 4), these may be utilized as reference curves. Now, if deviations in relation to said reference curve are measured during the injector assembly process (pressing-in of pole piece for the delimitation of the needle stroke) or the service life of the injector (vehicle operation), it is possible, with the stroke sensitivity (for example, change in Ψ/change in stroke), to again infer or calculate the absolute (mechanical) stroke. The stroke sensitivity may be determined on an injector-specific basis during the injector assembly process, or a mean value is utilized for all injectors.

The stroke sensitivity may be determined from changes in the curve at different needle strokes. Said stroke sensitivity amounts to, for example, 14 μWb/μm in FIG. 6. The different needle strokes may be achieved, for example during the injector assembly process, by means of different positions of the pole piece. During the injector assembly process, it is also possible for the pole piece to be pressed in stepped fashion, and for a mechanical measurement (probe) to be performed, for the purposes of setting a defined needle stroke.

Figure 6:
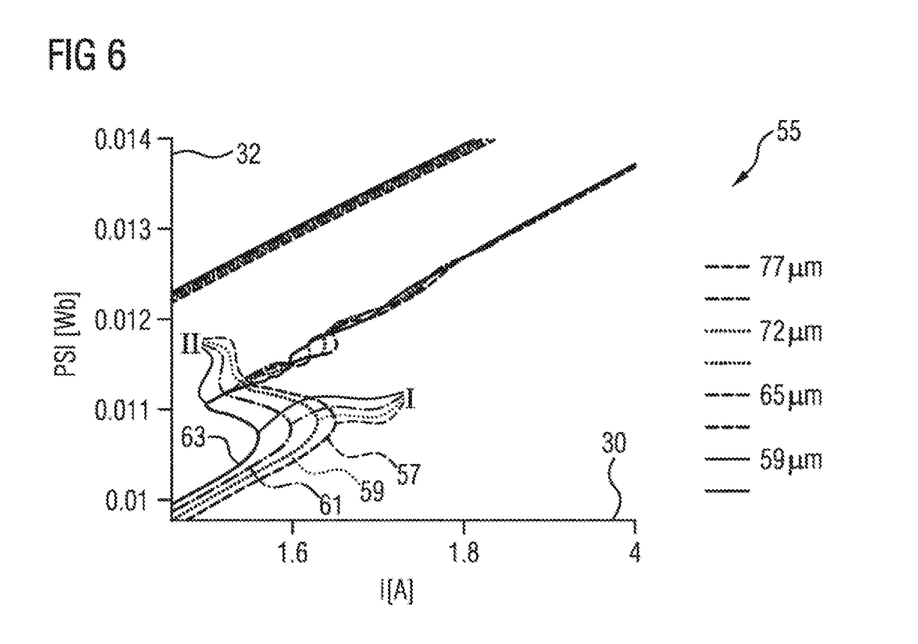
FIG. 6 illustrates graphs of reference data and measurement data of a magnetic valve whose stroke is to be determined according to embodiments of the present invention.

FIG. 6 shows a graph 55 with trajectories 57, 59, 61, 63, which exhibit working strokes of 77 μm, 72 μm, 65 μm and 59 μm respectively. Again, the states I and II are indicated in the various trajectories. The trajectories 57, 59, 61 and 63 may in turn be used as reference data or reference curves and also for the purposes, for example, of calculating the sensitivity (for example ΔΨ/ΔStroke or a reciprocal thereof). The stroke sensitivity may be determined from changes in the curve at different needle strokes. Said stroke sensitivity amounts to for example 14 μWb/μm in FIG. 6. The different needle strokes may be achieved, for example during the injector assembly process, by means of different positions of the pole piece. During the injector assembly process, it is also possible for the pole piece to be pressed in stepped fashion, and for a mechanical measurement (probe) to be performed, for the purposes of setting a defined needle stroke.

The greatest accuracy of the method may be achieved if the eddy currents within the armature (and also other magnetic ferromagnetic components) are as low as possible. To keep the eddy currents relatively low, it is for example possible to use a relatively slow actuation (that is to say, relatively low boost voltage). Here, sinusoidal or sawtooth-like or rectangular voltage or current forms may, for example, be used. In a particular embodiment of the invention, it is proposed that an injector be used in which no or reduced eddy currents occur. In such a case, it may be possible for the Ψ-I curves to be implemented even in the case of standard actuation (for example with 65 V boost voltage), because the curve profiles are much more pronounced during the stroke movements.

As already mentioned, the stroke determination is also possible without a complete measurement of a trajectory or curve in a Ψ-I coordinate system. Assuming that the parasitic air gaps remain approximately constant, it is sufficient for the curve to be evaluated or also measured only up to the state I (for an injector without idle stroke) or between the points II' and I (for an injector with idle stroke). It may be advantageous in each case that the stroke determination may be performed without the injector being opened (injection). That is to say, the measurement may be performed without influence on emissions.

The stroke values that are determined in accordance with embodiments of the present invention may be utilized further in a variety of ways. For example, the stroke values may be processed further as input variables for a model-based determination of the injector characteristic. A combination, for example, with variables with respect to time (overcoming of the idle stroke, needle abutment during opening/closing, current, voltage profiles etc.) is likewise possible. The determination and correction of a quantity deviation using the stroke data, possibly also incorporating measuring variables with respect to time, is likewise possible.

The measurement of curves and/or trajectories may be performed during normal vehicle operation when the inlet characteristic (in particular spray formation) is not significantly changed (emissions) as a result of the actuation. In the case of special actuation profiles, the actuation is, for example, also possible before the starting of the vehicle, in the presence of a depleted fuel pressure (no or minimal injection quantities) or during start/stop operation. It must basically be ensured that the metered fuel quantities and the combustion thereof do not lead to an exceedance of the emissions limits.

In the case of an injector which exhibits reduced eddy currents or no eddy currents, the standard actuation profile may be utilized during normal vehicle operation for the purposes of measuring the stroke. The correction of the determined stroke values, for example, by means of temperature, fuel pressure, etc., is possible. The actuation and evaluation may be performed by means of a special measurement unit. The method is, however, preferably performed by means of the existing (modified) engine control unit. The frequency of the measurement may be adapted to the change in the strokes that is to be expected, for example at defined kilometer intervals and/or in defined time steps and/or in a manner dependent on the load on the injectors (driving behavior).

The invention claimed is:

1. A method for determining a stroke of an armature of a magnetic valve which has a coil and the armature which is displaceable by magnetic force, the method comprising:
   providing at least one reference data set which comprises a magnitude of a current through the coil and a magnitude of magnetic flux of the coil in the case of a known magnitude of the stroke;
   generating a current flow through the coil of the magnetic valve in order to generate a magnetic field for generating a magnetic force on the armature, which magnetic force displaces the armature in the direction for the opening of a closure element;
   determining a magnitude of the magnetic flux when the armature abuts against a driver of the closure element; and
   determining the magnitude of the stroke on the basis of the determined magnitude of the magnetic flux and the reference data set,
   wherein the magnitude of the magnetic flux is determined before a first state is attained, in which the armature begins to displace the closure element, and
   wherein a magnitude of a working stroke of the armature is determined on the basis of the determined magnitude of the magnetic flux.

2. The method as claimed in claim 1, wherein the reference data set is representative of a curve in a coordinate system in which the current through the coil is plotted on one axis and the magnetic flux is plotted on another axis.

3. The method as claimed in claim 1, further comprising:
   determining a deviation of the determined magnitude of the magnetic flux from a magnitude of the magnetic flux of the reference data set assigned to the same current value; and
   using an already-known sensitivity of the magnitude of the magnetic flux as a function of the magnitude of the stroke, or an already-known sensitivity of the magnitude of the stroke as a function of the magnitude of the magnetic flux, in order to determine the magnitude of the stroke.

4. The method as claimed in claim 1,
   wherein the magnitude of the magnetic flux of the magnetic field is determined after a further state is attained, proceeding from which an idle stroke of the armature has been overcome and the armature abuts against the driver of the closure element, and
   wherein the magnitude of the working stroke of the armature is determined on the basis of the determined magnitude of the magnetic flux.

5. The method as claimed in claim 1, further comprising considering pairs of the magnitude of the current and the magnitude of the magnetic flux, in a graph, which correspond to a state trajectory of the armature during a closing process of the magnetic valve, wherein the first state is associated with at least one of the pairs in the case of which a sign of a gradient changes along the state trajectory.

6. The method as claimed claim 1, wherein the magnetic valve includes a pole piece, and the reference data set are carried out by measurement at the magnetic valve in the case of different set pole piece positions in the magnetic valve.

7. The method as claimed in claim 1, further comprising, for the generation of the current flow through the coil, applying firstly a boost voltage, between 3 V and 65 V, and subsequently a holding voltage, between 6 V and 14 V, wherein the armature comprises a slotted ferromagnetic material or layers of ferromagnetic material which are electrically insulated with respect to one another.

8. A method for actuating a magnetic valve which has a coil and an armature which is displaceable by magnetic force and with the aid of which, by a controllable closure element coupled to the armature, fuel is injected into a combustion chamber, the method comprising:
   determining a stroke of an armature of the magnetic valve, comprising:
      providing at least one reference data set which comprises a magnitude of a current through the coil and a magnitude of a magnetic flux of the coil in the case of a known magnitude of the stroke;
      generating a current flow through the coil of the magnetic valve in order to generate a magnetic field for generating a magnetic force on the armature, which magnetic force displaces the armature in the direction for the opening of a closure element;
      determining a magnitude of the magnetic flux when the armature abuts against a driver of the closure element;
      determining the magnitude of the stroke on the basis of the determined magnitude of the magnetic flux and the reference data set; and
   actuating the coil of the magnetic valve on the basis of the determined stroke,
   wherein a duration between application of a boost voltage for opening the magnetic valve and application of a voltage for closing the magnetic valve is reduced or increased upon a determination that the stroke has increased or decreased, respectively, in relation to a previous stroke, and further comprising, for the generation of current flow through the coil, applying firstly a boost voltage and subsequently a holding voltage, wherein the armature comprises a slotted ferromagnetic material or layers of ferromagnetic material which are electrically insulated with respect to one another.

9. The method of claim 8, wherein the magnitude of the magnetic flux is determined before a first state is attained, in which the armature begins to displace the closure element, and wherein a magnitude of a working stroke of the armature is determined on the basis of the determined magnitude of the magnetic flux.

10. The method of claim 9, wherein the magnitude of the magnetic flux of the magnetic field is determined after a further state is attained, proceeding from which an idle stroke of the armature has been overcome and the armature abuts against the driver of the closure element, and wherein the magnitude of the working stroke of the armature is determined on the basis of the determined magnitude of the magnetic flux.

11. The method of claim 9, further comprising considering pairs of the magnitude of the current and the magnitude of the magnetic flux, in a graph, which correspond to a state trajectory of the armature during a closing process of the magnetic valve, wherein the first state is associated with at least one of the pairs in the case of which a sign of a gradient changes along the state trajectory.

12. The method of claim 8, wherein the magnetic valve includes a pole piece, and the reference data set are carried out by measurement at the magnetic valve in the case of different set pole piece positions in the magnetic valve.

13. The method of claim 8, wherein the boost voltage is between 3 V and 65 V and the holding voltage is between 6 V and 14 V.

14. A device for determining a stroke of an armature of a magnetic valve which has a coil and the armature is displaceable by magnetic force, the device comprising:
  a memory providing at least one reference data set which is stored in the memory, the at least one reference data set comprises a magnitude of a current through the coil and a magnitude of a magnetic flux of the coil in the case of a known magnitude of the stroke;
  a driver generating a current flow through the coil of the magnetic valve in order to generate a magnetic field and to generate the magnetic force on the armature, which magnetic force displaces the armature in a direction for opening a closure element of the magnetic valve coupled to the armature; and
  a determination module coupled to the memory and which is configured
    to determine a magnitude of the magnetic flux when the armature abuts against a driver of the closure element, and
    to determine the magnitude of the stroke on the basis of the determined magnitude of the magnetic flux and the reference data set,
  wherein the magnitude of the magnetic flux is determined by the determination module before a first state is attained, in which the armature begins to displace the closure element, and
  wherein a magnitude of a working stroke of the armature is determined by the determination module on the basis of the determined magnitude of the magnetic flux.

15. The device of claim 14, wherein the magnitude of the magnetic flux of the magnetic field is determined by the determination module after a further state is attained, proceeding from which an idle stroke of the armature has been overcome and the armature abuts against the driver of the closure element, and wherein the magnitude of the working stroke of the armature is determined by the determination module on the basis of the determined magnitude of the magnetic flux.

16. The device of claim 14, wherein the determination module uses pairs of the magnitude of the current and the magnitude of the magnetic flux, in a graph, which correspond to a state trajectory of the armature during a closing process of the magnetic valve, wherein the first state is associated with at least one of the pairs in the case of which a sign of a gradient changes along the state trajectory.

17. The device of claim 14, wherein the magnetic valve includes a pole piece, and the reference data set are carried out by measurement at the magnetic valve in the case of different set pole piece positions in the magnetic valve.

18. The device of claim 14, for the generation of the current flow through the coil, the driver applies firstly a boost voltage and subsequently a holding voltage, wherein the armature comprises a slotted ferromagnetic material or layers of ferromagnetic material which are electrically insulated with respect to one another.

19. The device of claim 18, wherein the boost voltage is between 3 V and 65 V and the holding voltage is between 6 V and 14 V.

* * * * *